United States Patent
Mukai et al.

(10) Patent No.: US 9,127,170 B2
(45) Date of Patent: Sep. 8, 2015

(54) PLATING PRETREATMENT SOLUTION AND METHOD FOR PRODUCING ALUMINUM SUBSTRATE FOR HARD DISK DEVICES USING SAME

(75) Inventors: Nobuaki Mukai, Yamaguchi (JP); Takahiro Yoshida, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 13/981,355

(22) PCT Filed: Jan. 19, 2012

(86) PCT No.: PCT/JP2012/051049
§ 371 (c)(1),
(2), (4) Date: Jul. 24, 2013

(87) PCT Pub. No.: WO2012/102161
PCT Pub. Date: Aug. 2, 2012

(65) Prior Publication Data
US 2013/0309405 A1    Nov. 21, 2013

(30) Foreign Application Priority Data

Jan. 25, 2011 (JP) .................. 2011-013139

(51) Int. Cl.
*G11B 5/84* (2006.01)
*C09D 1/00* (2006.01)
*C23C 18/18* (2006.01)
*C23C 18/32* (2006.01)
*B05D 3/10* (2006.01)

(52) U.S. Cl.
CPC *C09D 1/00* (2013.01); *B05D 3/102* (2013.01); *C23C 18/1831* (2013.01); *C23C 18/32* (2013.01)

(58) Field of Classification Search
None
See application file for complete search history.

(56) References Cited

U.S. PATENT DOCUMENTS

| 4,728,456 A | | 3/1988 | Yamasoe et al. |
| 5,141,778 A | * | 8/1992 | Yarkosky et al. ............. 427/304 |
| 6,080,447 A | * | 6/2000 | Ferroni et al. ................ 427/321 |
| 2009/0133782 A1 | | 5/2009 | Uchida et al. |

FOREIGN PATENT DOCUMENTS

| JP | 61-106783 | 5/1986 |
| JP | 03-236476 | 10/1991 |
| JP | H08325763 | 12/1996 |
| JP | 2001-316831 | 11/2001 |
| JP | 2009-127101 | 6/2009 |
| WO | WO96/38238 | 12/1996 |

* cited by examiner

*Primary Examiner* — Kevin Bernatz
(74) *Attorney, Agent, or Firm* — McCarter & English

(57) ABSTRACT

An object of the invention is to provide a plating pretreatment solution that can convert the surface of an aluminum substrate for hard disk devices into a surface suitable for electroless nickel plating, and a method for producing an aluminum substrate for hard disk devices using the same. The plating pretreatment solution of the present invention used for a plating pretreatment in production of an aluminum substrate for hard disk devices has an iron ion concentration of 0.1 g/l to 1.0 g/l and a nitric acid concentration of 2.0 wt % to 12.0 wt %. This plating pretreatment solution is used for a pretreatment of a plating step in which electroless nickel plating is applied to an aluminum substrate for hard disk devices. Accordingly, the surface of the aluminum substrate for hard disk devices is converted into a surface suitable for electroless Ni plating, and a smooth surface of a plated film is obtained by suppressing generation of waviness, nodules, and pits on the plated surface when electroless nickel plating is performed in the plating step.

3 Claims, No Drawings

PLATING PRETREATMENT SOLUTION AND METHOD FOR PRODUCING ALUMINUM SUBSTRATE FOR HARD DISK DEVICES USING SAME

RELATED APPLICATIONS

This application is a national stage application filed under 35 USC 371 of PCT/JP2012/051049, filed Jan. 19, 2012, which claims the benefit of Japanese Patent Application No. 2011-013139, filed Jan. 25, 2011, all of which are incorporated herein, in entirety, by reference.

TECHNICAL FIELD

The present invention relates to a plating pretreatment solution, which is used for a pretreatment of electroless nickel plating to be applied to an aluminum substrate for hard disk devices, and a method for producing an aluminum substrate for hard disk devices using the same.

BACKGROUND ART

As a method for producing a magnetic disk substrate for hard disk devices (HDD), a method for producing a magnetic disk substrate, which includes performing a plating pretreatment prior to applying electroless nickel plating to an aluminum substrate, and applying electroless nickel plating to the aluminum substrate that has been subjected to the plating pretreatment, is typically known.

In the plating pretreatment, a cleaning treatment, an etching treatment, a desmutting treatment, and a zincate treatment are performed. As the zincate treatment, a double zincate treatment is known that includes performing a de-zincate treatment following a first zincate treatment, and then performing a second zincate treatment.

When the surface of an electroless nickel plating film has a large number of waviness, protrusion defects called nodules, or recess defects called pits, there is a possibility that such defects may not be able to be completely removed in a polishing step, and thus may remain as defects. Thus, it is necessary to develop an electroless plating method that can obtain a smoother surface of a plating film.

For example, Patent Literature 1 describes a method of smoothing the surface of a plating film by including metal ions of Group IV of the periodic table in a nitric acid bath used in a desmutting treatment in order to obtain a surface of a plating film without protrusion defects.

CITATION LIST

Patent Literature

Patent Literature 1: JP 3-236476 A (1991)

SUMMARY OF INVENTION

Technical Problem

The inventors of the present invention have conducted concentrated studies and found that when iron ions are added to a nitric acid bath used for a desmutting treatment or a de-zincate treatment of a double zincate treatment, pits (recess defects) will be easily generated on the surface of the plating film although generation of nodules are reduced.

The present invention has been made in view of the foregoing, and it is an object of the present invention to provide a plating pretreatment solution that can convert the surface of an aluminum substrate into a surface that is suitable for electroless nickel plating, and a method for producing an aluminum substrate for hard disk devices using the same.

Solution to Problem

The treatment solution of the present invention that solves the aforementioned problem is a plating pretreatment solution used for a plating pretreatment in production of an aluminum substrate for hard disk devices, and is characterized by containing iron ions at a concentration of 0.1 g/l to 1.0 g/l and nitric acid at a concentration of 2.0 wt % to 12.0 wt %.

A production method for an aluminum substrate for hard disk devices that uses the plating pretreatment solution of the present invention includes a double zincate treatment. In this case, the plating pretreatment solution of the present invention can be used for both a desmutting treatment and a de-zincate treatment. Alternatively, the plating pretreatment solution may be used for either one of the desmutting treatment or the de-zincate treatment. The present invention can be used not only for a pretreatment of Ni—P plating but also for a pretreatment of plating including Ni. For example, the present invention can be used for a pretreatment of plating such as Ni—B, Ni—W, Ni—P—In, Ni—P—Mo, Ni—P—W, or Ni—P—B.

With the plating pretreatment solution of the present invention, an ultra-small amount of iron can be deposited on the substrate surface of the aluminum substrate, and in the following zincate treatment, uniform deposition of zinc can be promoted, starting from the iron, whereby the plated surface can be smoothed. Further, by controlling the nitric acid concentration to suppress excessive deposition of iron and prevent erosion of aluminum or erosion by nitric acid, it is possible to suppress generation of pits.

Advantageous Effects of Invention

According to the plating pretreatment solution of the present invention, a plated surface can be smoothed in electroless nickel plating. In addition, generation of pits can be suppressed by controlling the nitric acid concentration of the plating pretreatment solution to be within the range of 2.0 to 12.0 wt %.

Thus, it is possible to convert the surface of the aluminum substrate into a surface that is suitable for electroless nickel plating, and obtain, when electroless nickel plating is performed, a smooth surface of a plating film by suppressing generation of waviness, nodules, and pits on the plated surface.

The present specification contains subject matter disclosed in the specification of Japanese Priority Patent Application JP 2011-13139 that forms the basis of the priority claim of the present application.

DESCRIPTION OF EMBODIMENTS

Hereinafter, embodiments of the present invention will be described. A plating pretreatment solution in accordance with this embodiment is used for production of a magnetic disk substrate for hard disk devices, and is used for a plating pretreatment that is performed prior to applying electroless nickel plating to an aluminum substrate. The plating pretreatment solution can be used for a pretreatment of not only Ni—P plating, but also for a pretreatment of plating including Ni. For example, it can be used a pretreatment of plating such as plating pretreatment of Ni—B, Ni—W, Ni—P—In, Ni—P—Mo, Ni—P—W, or Ni—P—B.

The substrate surface of the aluminum substrate subjected to the plating pretreatment is then subjected to electroless nickel plating as is conventionally done, and then, the surface of the electroless nickel plating film is subjected to mirror polishing, and further, a magnetic film, a protective film, and a lubricating film are deposited thereon to form a magnetic disk substrate.

In the aforementioned plating pretreatment, (i) a cleaning treatment, (ii) an etching treatment, (iii) a desmutting treatment, and (iv) a zincate treatment are performed. It should be noted that a water-washing treatment is executed between each of steps (i) to (iv).

(i) The cleaning treatment is a step of removing oil on the substrate surface of the aluminum substrate through an alkaline bath, and can be performed using a commercial cleaning liquid. (ii) The etching treatment is a step of removing minute protrusions on the substrate surface of the aluminum substrate, and can be performed using a known etching treatment liquid including sulfuric acid.

(iii) The desmutting treatment is a step of removing smuts generated on the substrate surface through the alkaline bath of the cleaning treatment, and is performed using the plating pretreatment solution of the present invention, that is, a plating pretreatment solution containing iron ions at a concentration of 0.1 g/l to 1.0 g/l and nitric acid at a concentration of 2.0 wt % to 12.0 wt %.

When a desmutting treatment is performed using the plating pretreatment solution of the present invention, an ultra-small amount of iron can be deposited on the substrate surface of the aluminum substrate, and in the following (iv) zincate treatment, uniform deposition of zinc can be promoted, starting from the iron, whereby the plated surface can be smoothed. Further, by controlling the nitric acid concentration to suppress excessive deposition of iron and prevent erosion of aluminum or erosion by nitric acid, it is possible to suppress generation of pits.

(iv) The zincate treatment is a step of depositing a zinc film on the substrate surface to improve the adhesion between the aluminum substrate and the electroless nickel plating film. In this embodiment, as the double zincate treatment, which includes forming a zinc film on the substrate surface, removing the zinc film, and then forming a zinc film again, a first zincate treatment, a de-zincate treatment, and a second zincate treatment are performed.

The first zincate treatment is a step of forming a zinc film by immersing an aluminum substrate in a known zincate treatment liquid that has been conventionally used to deposit zinc on the substrate surface. The zincate treatment liquid may, in addition to containing zinc as a metal component, further contain metallic salt of iron or the like, or a complexing agent for the contained metal.

The de-zincate treatment is a step of removing the zinc film formed in the first zincate treatment to obtain excellent adhesion of plating, and is performed using the plating pretreatment solution of the present invention, that is, a plating pretreatment solution containing iron ions at a concentration of 0.1 g/l to 1.0 g/l and containing nitric acid at a concentration of 2.0 wt % to 12.0 wt %.

The second zincate treatment is a step of forming a zinc film by immersing the aluminum substrate again in a known zincate treatment liquid that has been conventionally used, and depositing denser, finer zinc particles than in the first zincate treatment on the substrate surface. The zincate treatment liquid may, in addition to containing zinc as a metal component, further contain metallic salt of iron or the like.

Electroless nickel plating can be performed by adopting a known plating bath and plating conditions that include a nickel complexing agent such as water-soluble nickel salt, organic salt, or ammonium salt, and uses as a reducing agent hypophosphoric acid or hypophosphite such as sodium hypophosphite.

According to the aforementioned plating pretreatment solution, if the iron ion concentration is set in the range of 0.1 g/l to 1.0 g/l, it is possible to deposit an ultra-small amount of iron on the substrate surface of the aluminum substrate in a pretreatment of plating, and promote, in the following zincate treatment, uniform deposition of zinc, starting from the iron, whereby the plated surface can be smoothed in the electroless nickel plating. Thus, generation of waviness and nodules on the substrate surface after plating can be suppressed.

Meanwhile, if the nitric acid concentration of the plating pretreatment solution is set in the range of 2.0 wt % to 12.0 wt %, it is possible to prevent excessive deposition of iron and prevent erosion of aluminum or erosion by nitric acid, and thus suppress generation of pits. In this case, for the iron ions of the iron source added to the plating pretreatment solution, divalent or trivalent iron ions can be used, and more preferably, trivalent iron ions are used.

Note that when the iron ion concentration is less than 0.1 g/l, the effect of reducing nodules and waviness after the plating treatment can be low, while when the iron ion concentration is higher than 1.0 g/l, it is conceivable that the aluminum substrate can corrode, and pits will be generated on the surface after the plating treatment. Meanwhile, when the nitric acid concentration is less than 2.0 wt % or is higher than 12 wt %, it is conceivable that the aluminum substrate can corrode, and pits will be generated on the surface after the plating treatment.

By performing a desmutting treatment, which is a pretreatment of a zincate treatment, and performing a de-zincate treatment, which is a pretreatment of a second zincate treatment, using the plating pretreatment solution with the aforementioned composition, it is possible to uniformly deposit iron on the surface of the aluminum substrate, and uniformly deposit zinc in the zincate treatment, starting from the deposited iron. Such a plating pretreatment solution can be used more effectively when it is used for both the steps of the desmutting treatment and the de-zincate treatment, but even when the solution is used for only one of the steps, the effect can still be obtained.

EXAMPLES

Hereinafter, the content of the present invention will be specifically described with reference to examples and comparative examples. It should be noted that the present invention is not limited to the following examples.

A commercially available 3.5-inch aluminum substrate with an average surface roughness of Ra=15 nm was subjected to a cleaning treatment at 50° C. for two minutes using a cleaning liquid containing known sodium phosphate and surfactant, and then was subjected to an etching treatment at 50° C. for two minutes using a known etching liquid containing sulfuric acid and phosphoric acid.

Then, a desmutting treatment was performed at 20° C. for 30 seconds using a nitric acid treatment liquid (a plating pretreatment solution) with a composition shown in Table 1, and then a first zincate treatment was performed at 20° C. for 30 seconds using a known alkaline zincate treatment liquid containing sodium hydroxide, zinc, iron, and a complexing agent therefor.

Further, a de-zincate treatment was performed at 20° C. for 30 seconds using a nitric acid treatment liquid (a plating pretreatment solution) with the conditions shown in Table 1, and then a second zincate treatment was performed at 20° C. for 30 seconds using a known alkaline zincate treatment liquid containing sodium hydroxide, zinc, iron, and a complexing agent therefor.

Next, electroless nickel plating was performed at 85° C. for 2.0 hours using a known malate-succinate electroless nickel plating liquid.

The condition of the plated surface was evaluated based on nodules, waviness of the substrate surface, and pits.

With regard to nodules, the number of nodules on the substrate surface of the aluminum substrate after plating was measured using a medium surface inspection apparatus (Candela 5100, a product of KLA-Tencor Corporation).

With regard to waviness, the height of waviness with a wavelength of 5 mm on the substrate surface was measured for the aluminum substrate before the cleaning treatment and after the electroless nickel plating, using a flatness measuring apparatus (Opti flat, a product of KLA-Tencor Corporation), to calculate waviness that has increased during the period from the cleaning treatment to the electroless nickel plating.

With regard to pits, the substrate surface of the aluminum substrate after plating was observed at a magnification of 40 times using an optical microscope of Nikon Corporation, to measure the amount of pits.

Table 1 below shows the measurement results of waviness, nodules, and pits generated on the surfaces of the plating films by electroless nickel plating.

to which iron ions are added to be within the range of 2.0 wt % to 12.0 wt %. In particular, when the nitric acid concentration is controlled to be within the range of 5.0 wt % to 10.0 wt % as in Examples 2 to 4, it is seen that the number of pits is 0.082, which is the smallest number as compared to those of the other examples, and thus is particularly preferable.

Meanwhile, when the nitric acid concentration is less than 2.0 wt % as in Comparative Example 2 or is higher than 12 wt % as in Comparative Examples 1, 3, and 4, it is considered that the number of pits generated on the substrate surface after the plating treatment increases as the aluminum substrate corrodes.

Accordingly, it is found that both generation of pits and suppression of nodules and waviness can be simultaneously achieved by limiting the nitric acid concentration of the nitric acid treatment liquid (the plating pretreatment solution) to which iron ions are added in appropriate quantity to an appropriate range.

It should be noted that the present invention is not limited to the aforementioned embodiments, and various modifications are possible within the spirit and scope of the present invention. For example, although the aforementioned embodiments illustrate examples in which a double zincate treatment is performed as a zincate treatment, and the plating pretreatment solution of the present invention is used for both a desmutting treatment and a de-zincate treatment, the solution may also be used for either one of the desmutting treatment or the de-zincate treatment. Further, not only when a double zincate treatment is performed but also when a zincate treatment and a de-zincate treatment are alternately and repeatedly performed, a de-zincate treatment that uses the plating pretreatment solution of the present invention may be performed at least once.

TABLE 1

|  | Nitric Acid Treatment Liquid Conditions | | Plated Surface Conditions | | |
|---|---|---|---|---|---|
|  | Iron Ions (g/l) | Nitric Acid Concentration (wt %) | Number of Nodules (count/mm$^2$) | Waviness (nm) | Number of Pits (count/mm$^2$) |
| Comparative Example 1 | 0 | 30.0 | 1.665 | 0.655 | 0.115 |
| Comparative Example 2 | 0.41 | 1.0 | 0.888 | 0.484 | 0.148 |
| Example 1 |  | 2.5 | 0.920 | 0.547 | 0.099 |
| Example 2 |  | 5.0 | 0.872 | 0.530 | 0.082 |
| Example 3 |  | 7.5 | 0.856 | 0.579 | 0.082 |
| Example 4 |  | 10.0 | 0.830 | 0.543 | 0.082 |
| Comparative Example 3 |  | 15.0 | 1.005 | 0.581 | 0.181 |
| Comparative Example 4 |  | 30.0 | 0.989 | 0.575 | 0.197 |
| Example 5 | 0.1 | 10.0 | 1.055 | 0.555 | 0.090 |
| Example 6 | 0.56 |  | 0.781 | 0.427 | 0.095 |
| Example 7 | 1.0 |  | 0.779 | 0.451 | 0.105 |
| Comparative Example 5 | 1.2 |  | 0.742 | 0.430 | 0.366 |
| Comparative Example 6 | 1.8 |  | 0.761 | 0.445 | 1.184 |

The results of Table 1 can confirm that in Examples 1 to 7 in which iron ions are added in appropriate quantity to a nitric acid treatment liquid (a plating pretreatment solution), nodules and waviness are reduced as compared to those of Comparative Example 1 in which iron ions are not added. Meanwhile, when the iron ion concentration is less than 0.1 g/l as in Comparative Example 1, the effect of reducing nodules and waviness is lower, while when the iron ion concentration is higher than 1.0 g/l as in Comparative Examples 5 and 6, it is considered that the number of pits generated on the surface after the plating treatment increases as the aluminum substrate corrodes.

In addition, it is seen that generation of pits can be suppressed by controlling the nitric acid concentration of the nitric acid treatment liquid (a plating pretreatment solution)

We claim:

1. A production method for an aluminum substrate for hard disk devices, comprising applying electroless Ni plating to an aluminum substrate in a plating step, wherein a plating pretreatment solution is used as a pretreatment before the plating, the solution including iron ions at a concentration of 0.1 g/L to 1.0 g/L, and nitric acid at a concentration of 2.0 wt % to 12.0 wt %, wherein the pretreatment is a desmutting treatment and a de-zincate treatment performed after a zincate treatment, and wherein the number of pits generated on the plated surface of the aluminum substrate is 0.105 pits/mm$^2$ or less.

2. The production method for an aluminum substrate for hard disk devices according to claim 1, wherein the concentration of the nitric acid in the plating pretreatment solution is 5.0 wt % to 10.0 wt %.

3. The production method for an aluminum substrate for hard disk devices according to claim 1, wherein the electroless Ni plating is Ni—P plating.

* * * * *